United States Patent [19]
Shiraishi et al.

[11] Patent Number: 5,134,511
[45] Date of Patent: Jul. 28, 1992

[54] OPTICAL UNIT FOR USE IN LASER BEAM PRINTER OR THE LIKE

[75] Inventors: Takashi Shiraishi, Tokyo; Masao Yamaguchi, Yokohama; Ken Omura, Tokyo; Naruhito Yoshida, Yokohama, all of Japan

[73] Assignee: Kabushiki Kaisha Toshiba, Kawasaki, Japan

[21] Appl. No.: 621,819

[22] Filed: Dec. 4, 1990

[30] Foreign Application Priority Data

Dec. 8, 1989 [JP]  Japan .................................. 1-319231
Dec. 8, 1989 [JP]  Japan .................................. 1-319232

[51] Int. Cl.$^5$ ............................................. G02B 26/10
[52] U.S. Cl. .................................... 359/196; 359/217; 250/235
[58] Field of Search ............... 359/196, 216, 217, 820, 359/218, 219, 220; 346/108; 250/235, 236

[56] References Cited

U.S. PATENT DOCUMENTS

| | | | |
|---|---|---|---|
| 4,171,902 | 10/1979 | Imai et al. .................... | 355/3 |
| 4,264,120 | 4/1981 | Uchiyama et al. ............. | 359/218 |
| 4,733,064 | 3/1988 | Ishikawa ....................... | 359/218 |
| 4,792,695 | 12/1988 | Blandford ..................... | 359/218 |
| 4,802,721 | 2/1989 | Fujita ............................ | 359/218 |
| 4,847,492 | 7/1989 | Houki ........................... | 359/218 |
| 4,941,719 | 7/1990 | Hisada et al. ................. | 359/217 |
| 4,978,977 | 12/1990 | Ohmori et al. ................ | 359/217 |

FOREIGN PATENT DOCUMENTS 0269450  11/1987  European Pat. Off. .
2501385  3/1982   France .

*Primary Examiner*—Loha Ben
*Attorney, Agent, or Firm*—Foley & Lardner

[57] ABSTRACT

In an optical unit incorporated in a laser beam printer, a laser beam generated by a laser diode is converted by a group of conversion lenses into a laser beam having a predetermined-size cross section. The laser beam is directed toward a photosensitive body by a scanner unit, so as to scan the photosensitive body. A focusing lens allows the rotataing angle of the reflecting faces of the scanner unit to correspond to a desirable point on the surface of the photosensitive body. In other words, the rotating angle is made to correspond to the distance between the optical axis center determined with respect to a main scanning direction and a point to which the laser beam is irradiated for scanning. The conversion lenses include at least one aspheric glass lens. The conversion lenses further includes a pair of plastic lenses which have substantially the same power and opposite polarities with respect to either the main scanning direction or a subscanning direction. Among the lenses mentioned above, that lens which is located closest to the glass lens is integral with the laser diode. The focusing lens is formed of a material having substantially equivalent characteristics to those of the paired plastic lenses.

8 Claims, 8 Drawing Sheets

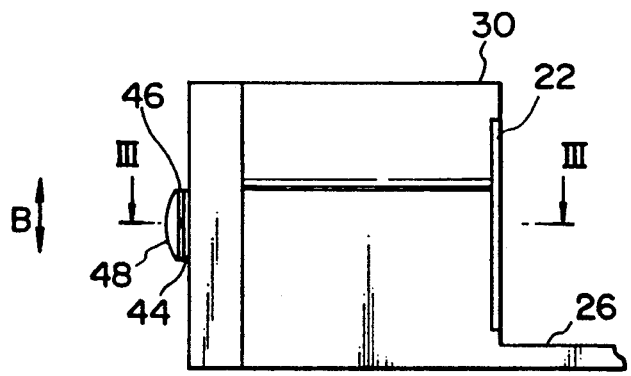
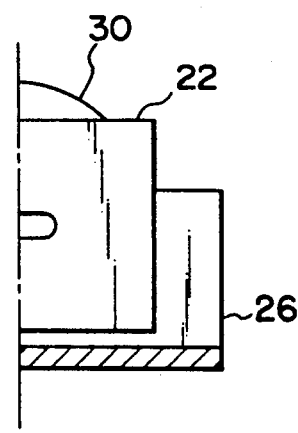
F I G. 3A        F I G. 3B
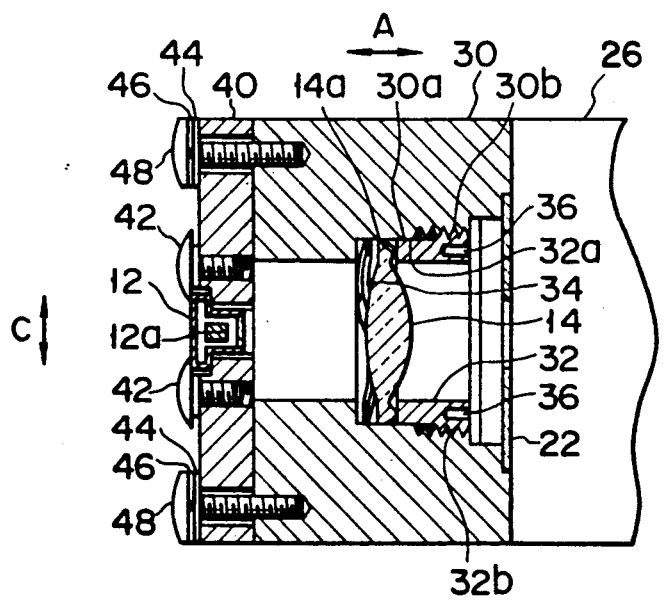
F I G. 3C

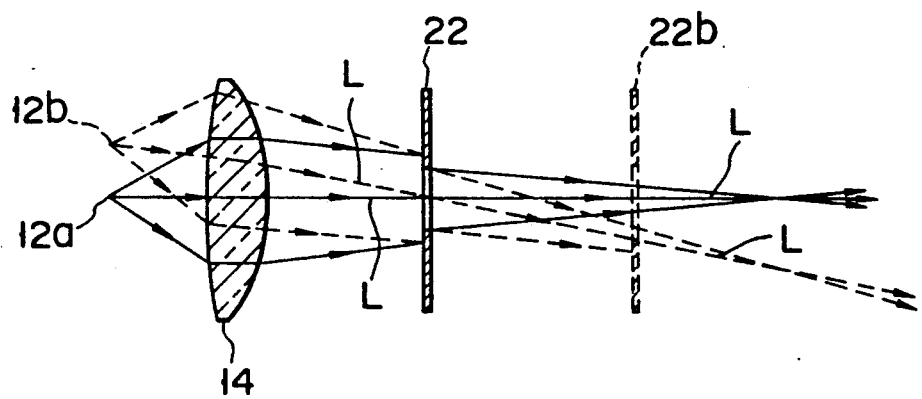
F I G. 4

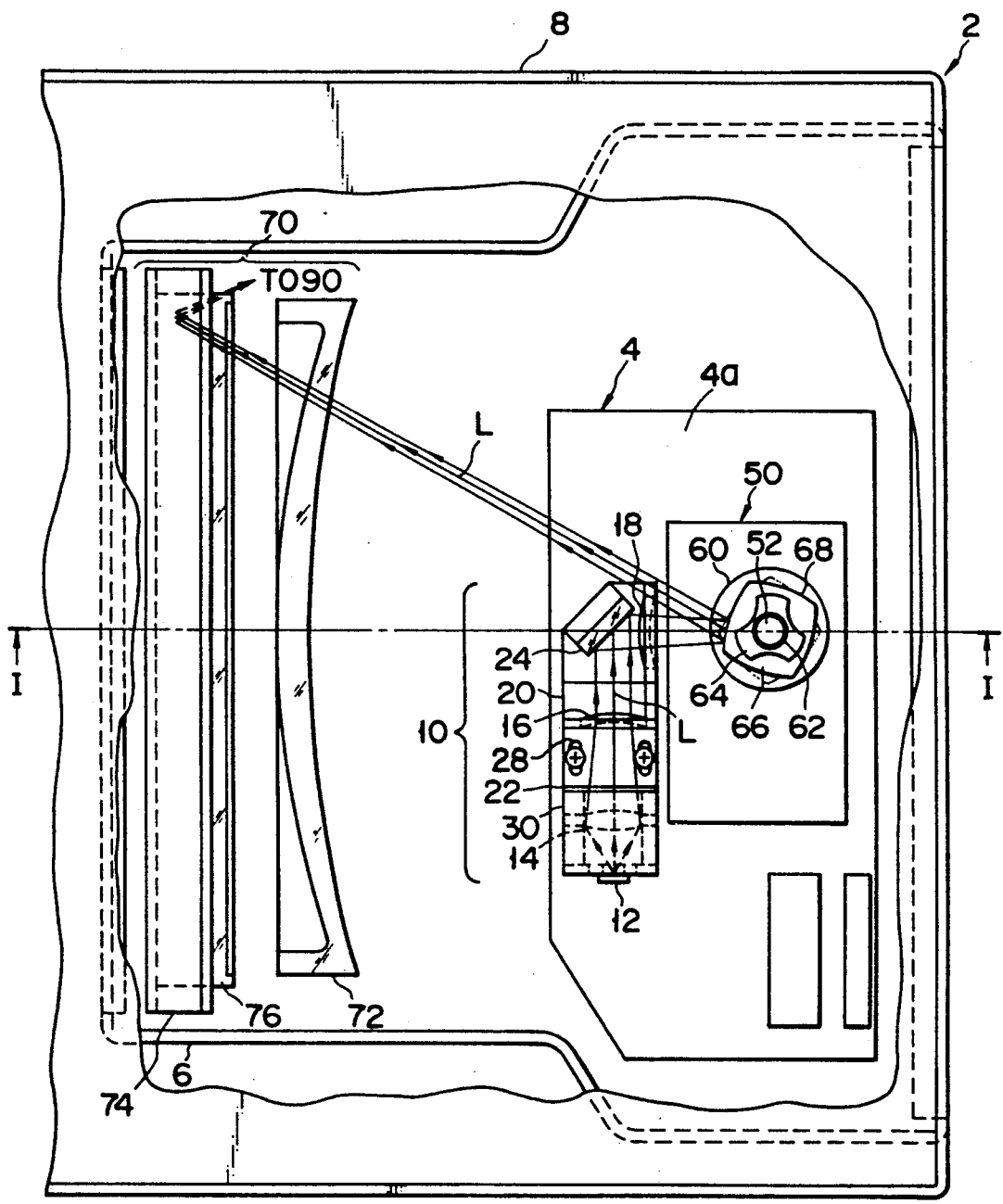
F I G. 6

OPTICAL UNIT FOR USE IN LASER BEAM PRINTER OR THE LIKE

BACKGROUND OF THE INVENTION

1. Field of the Invention

The present invention relates to an optical unit for use in a laser beam printer, and more particularly to an optical unit which guides a laser beam from a laser diode to an object to be scanned, by way of a group of focusing lenses and a scanner.

2. Description of the Related Art

In general, an optical unit incorporated in a laser beam printer or the like is designed such that a laser beam output from a laser diode is guided first to a scanner, i.e., an optical deflector and then to a photosensitive body, i.e., an object to be scanned. Before reaching the photosensitive body, the laser beam passes through a first optical system and a second optical system. The first optical system converges the laser beam generated by the laser diode, while the second optical system focuses the laser beam to a predetermined position on the surface of the photosensitive body. When passing through the first and second optical systems, the laser beam is made to have a cross section of desirable size.

The first optical system is a combination of lenses, such as an aspheric glass lens, plastic lenses, etc. The second optical system is a combination of lenses, such as an fθ lens. By this fθ lens, the deflection angle at which a laser beam is deflected by the scanner is changed in proportion to the position at which the laser beam is focused on the photosensitive body and which is expressed in relation to the main scanning direction.

In general, the laser diode and that lens of the first optical system which collimates the laser beam generated by the laser diode are assembled together as a laser unit. The lenses of the first optical system other than the collimator lens guide the collimated laser beam to the scanner. These beam-guiding lenses are provided independently of one another, or are assembled together as one unit.

Each of the scanner and second optical system is provided independently of the first optical system, and is individually arranged with reference to a frame member.

In comparison with the scanner and the second optical system, the laser diode and those lenses of the first optical system other than the collimator lens have to be arranged with very high accuracy. Due to this, the kind of the material constituting the frame member is limited, and the working process is also restricted. In addition, the laser diode has an astigmatic range; that is, the laser diode has different apparent light-emitting points between a vertical direction and a horizontal direction. When the optical unit is assembled, therefore, the position of the laser diode must be adjusted such that the beam spot of a laser beam falls within an optimal region determined in relation to both the vertical and horizontal directions. Thus, a lot of time and complicated procedures are required for the assembly and adjustment of the optical unit.

SUMMARY OF THE INVENTION

Accordingly, an object of the present invention is to provide a lens-holding structure, which is to be incorporated in an optical unit employed in a laser beam printer or the like.

Another object of the present invention is to provide an optical unit which is easy to assemble and adjust and which prevents focal lengths of lenses from varying is spite of a change in the ambient temperature.

Still another object of the present invention is to provide an optical unit which is made up of low-in-price members or parts and can be assembled at low cost.

The present invention provides an optical unit which is to be incorporated in a printer or the like and which comprises: means for generating a light beam; means for converting the generated light beam into a light beam which is collimated in a first plane expanding in one of main and sub-scanning directions and which is converged in a second plane expanding in the other of the main and sub-scanning directions; means, being movable in a predetermined direction, for integrally holding the generating means and the first converting means; second converting means for converting the light beam emitted from the first converting means into a convergent light beam which is convergent in both the first and second planes; means for reflecting the light beam emitted from the second converting means in a predetermined direction; means for guiding the light beam reflected by the scanning means to a predetermined portion on the surface of an object to be scanned, while simultaneously shaping the light beam to have a predetermined diameter; and second holding means for holding the first holding means, the second converting means, the scanning means and the guiding means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and th detailed description of the preferred embodiments given below, serve to explain the principles of the invention.

FIG. 3A is a side view of a lens barrel which is to be incorporated in the optical unit shown in FIGS. 1A and 1B and by which a focusing optical system, a light source, etc. are held;

FIG. 3B is a right side view of the lens barrel shown in FIG. 3A;

FIG. 3C is a sectional view taken along line III—III shown in FIG. 3A;

FIG. 4 is a schematic sectional view illustrating the positional relationship between the lens barrel which is shown in FIGS. 3A-3C and a stop which is used for restricting the amount of light beam generated by a laser diode;

FIG. 6 is a plan view showing an optical unit according to another embodiment of the present invention.

DETAILED DESCRIPTION OF THE PREFERRED EMBODIMENTS

An embodiment of the present invention will now be described, with reference to the accompanying drawings.

Figure 1A:
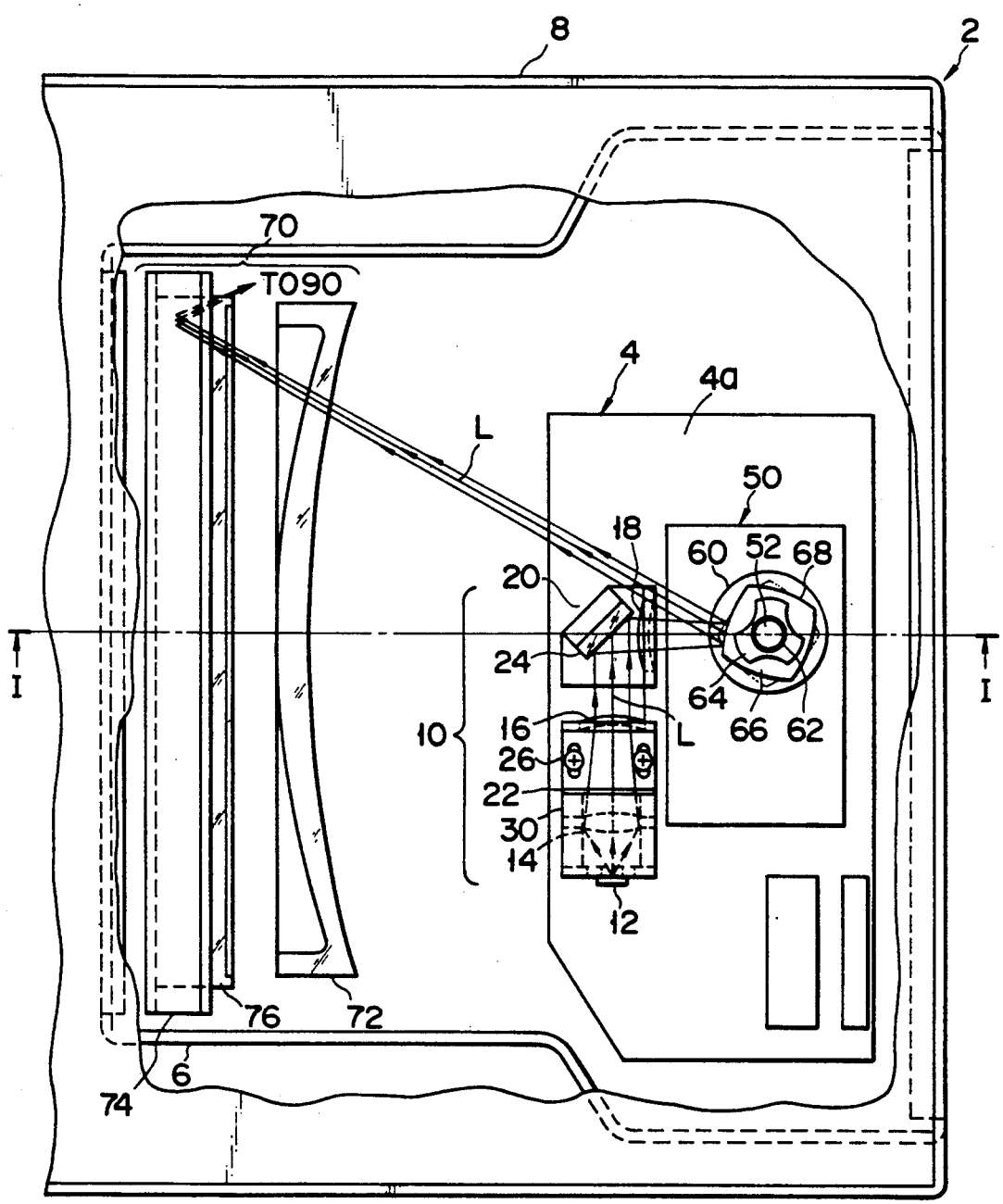
FIG. 1A is a plan view of an optical unit according to one embodiment of the present invention.
Figure 1B:
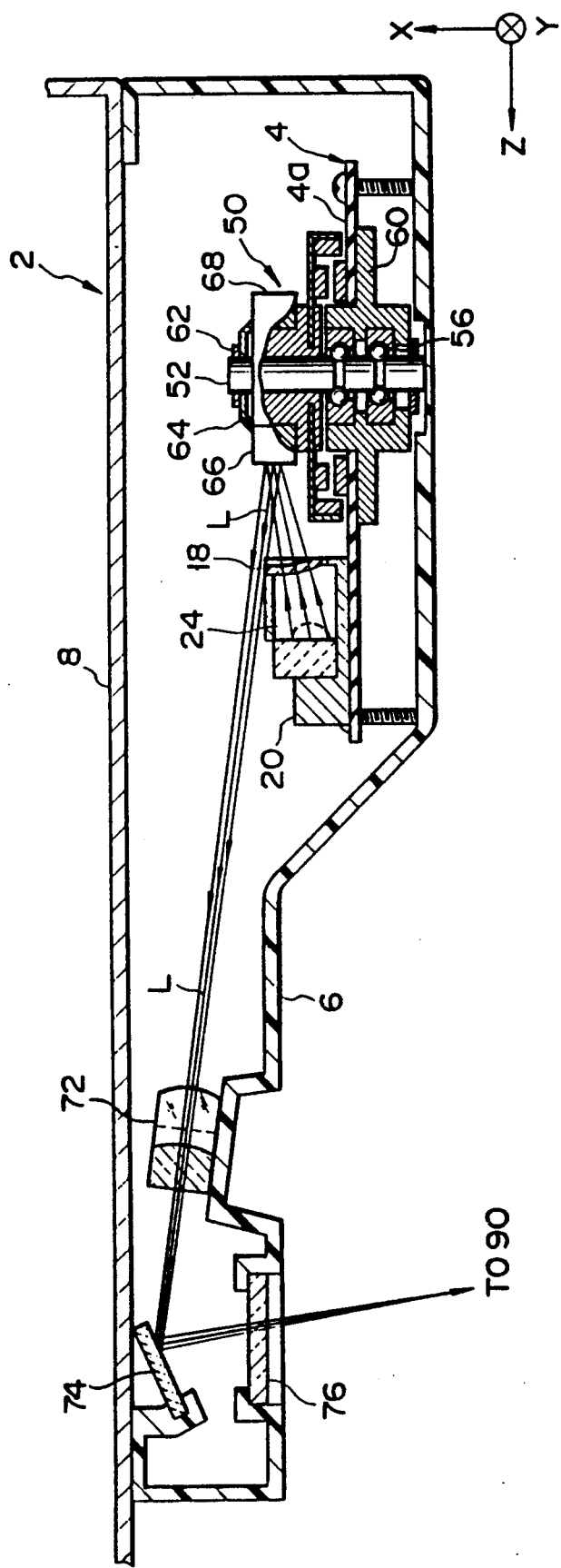
FIG. 1B is a sectional view taken along line I—I in FIG. 1.
Figure 2A:
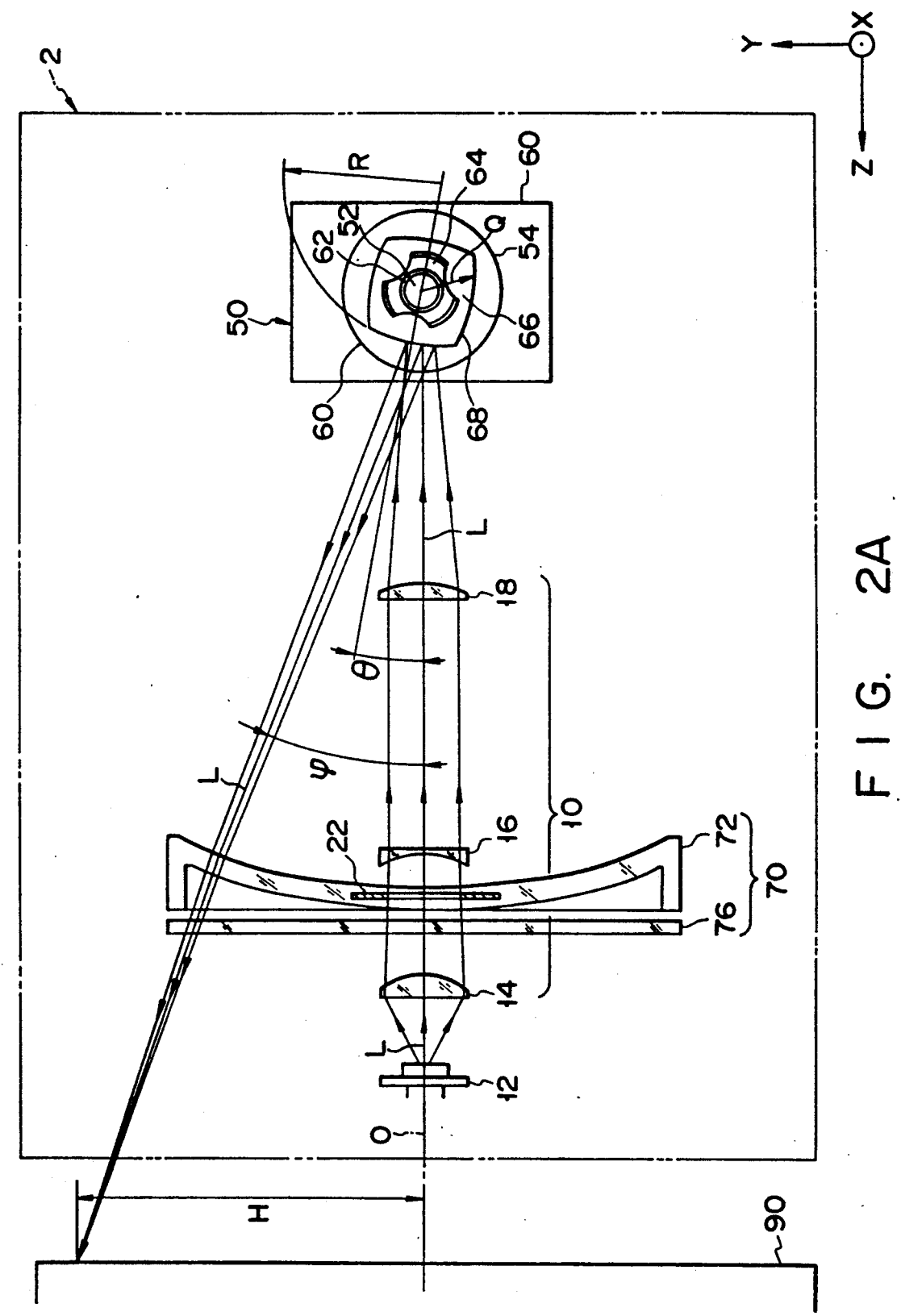
FIG. 2A is a plan view showing the arrangement of optical components of the optical unit, along with laser beam paths.
Figure 2B:
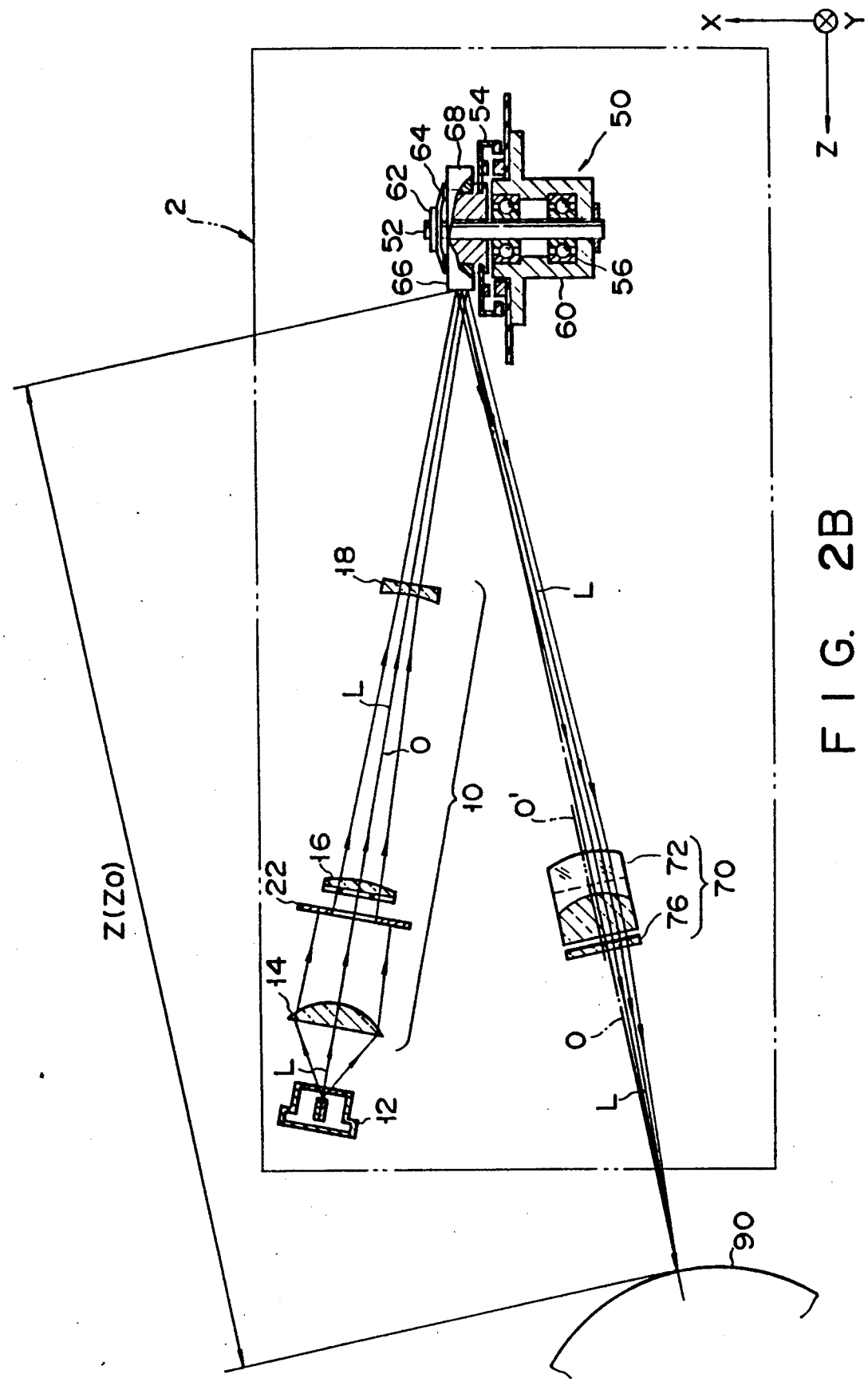
FIG. 2B is a sectional view showing the laser beam paths, the sectional view being obtained by taking the plan view shown in FIG. 2A along a plane which is in the vicinity of a center determined with reference to a main scanning direction.

As is shown in FIGS. 1A and 1B, an optical unit 2 is provided with an outer housing 6 and a base plate 8. The base plate 8 covers the outer housing 6 and seals the interior of the optical unit 2. The base plate 8 constitutes part of a laser beam printer. The outer housing 6 contains: a laser diode 12 for generating a laser beam L; a laser scanning device 4 made up of a first optical system 10 and a scanner 50 which are integrally arranged; and a second optical system 70. The first optical system 10 includes a group of conversion lenses, while the second optical system 70 includes a group of focusing lenses. Although not shown, the optical unit 2 is provided with a monitoring optical device which monitors whether or not a laser beam L, guided through the conversion lenses and focusing lenses and used for scanning a photosensitive body 90, is horizontally synchronized.

The laser scanning device 4 is mounted on an insulating base 4a. This insulating base 4a need not be used if the housing 6 is formed of an insulating material. As is shown in FIGS. 3A-3C, the laser diode 12 and at least one lens of the first optical system 10 are assembled in such a manner as to constitute a lens barrel 30.

The laser beam L generated by the laser diode 12 is converged when it passes through the first optical system 10. The laser beam L is directed to the reflecting faces of the scanner 50, and is therefore deflected toward the second optical system 70 at a nonuniform angular velocity. By this second optical system 70, the laser beam L is made to have a predetermined beam size and is focused on a desirable point on the surface of the photosensitive body 90. In other words, the photosensitive body 90 is scanned with the laser beam L which is reflected at the angle of rotation of the mirror surfaces 68 of the scanner 50. With the laser beam L being directed to the photosensitive body 90 in the manner mentioned above, character data and/or graphics data, which is supplied from external circuits, such as a laser beam-modulating circuit (not shown) and an information input unit (not shown), is supplied to the circumferential surface of the photosensitive body 90. As a result, an electrostatic latent image is formed on the circumferential surface of the photosensitive body 90.

The photosensitive body 90 is rotated in a predetermined direction by a driver (not shown), so that the electrostatic latent image is successively formed in accordance with the rotation of the photosensitive body 90. The electrostatic latent image, thus formed, is developed by a developing means (not shown), and is then transferred onto a given medium (not shown).

Part of the laser beam L passing through the second optical system 70 is reflected by a horizontal synchronization-detecting mirror (not shown) at each scan performed in the main scanning direction. The reflected laser beam L is guided to a synchronization signal detector (not shown), for the detection of horizontal synchronization.

The first optical system 10 includes: a glass lens 14 which converges the laser beam L produced by the laser diode 12; first plastic lens 16 which collimates the laser beam, slightly-converged by the glass lens 14, in a main scanning direction; and second plastic lens 18 which converges the laser beam, passing through the first plastic lens 16, in a main and sub-scanning direction. The glass lens 14 and the laser diode 12 are integrally assembled to constitute the lens barrel 30 shown in FIGS. 3A-3C. A stop 22, which restricts the beam spot of the laser beam L, is arranged at the backside focal point of the glass lens 14. The first plastic lens 16 is secured to a first optical system base 26. The first optical system base 26 holds the lens barrel 30, and is arranged on the insulating base 4a to be movable in the direction indicated by arrow D. The second plastic lens 18 is secured to the housing 20, together with a first mirror 24 for bending a laser beam. Like the first optical system base 26, the housing 20 is arranged on the insulating base 4a.

The glass lens 14 is a convex lens formed of optical glass, such as BK7, As is seen in FIGS. 3A-3C, it has an integral flange 14a, by means of which it is secured to the lens barrel 30. The first plastic lens 16 is formed of, e.g., polymethyl methacrylate (PMMA) and has a toric surface. The toric surface has negative power in the main scanning direction and slightly-negative power in the sub-scanning direction. Although not shown, the first plastic lens 16 has a flange by means of which it is attached to a housing 20. It also has either a positioning projection or a positioning hollow section formed substantially at the center with respect to the main scanning direction.

Like the first plastic lens 16, the second plastic lens 18 is formed of, e.g., PMMA. It has toric surfaces which have positive power in the main scanning direction and negative power in the sub-scanning direction. Although not shown, the second plastic lens 18 has a flange by means of which it is attached to the housing 20. It also has either a positioning projection or a positioning hollow section formed substantially in the center with respect to the main scanning direction.

The scanner 50 includes a polygonal mirror 66 which includes a plurality of deflecting mirrors 68 for reflecting a laser beam L. Each deflecting mirror surface 68 is convex in the main scanning direction. In other words, the deflecting mirror surface 68 is curved with a predetermined radius R of curvature. The number of deflecting mirror surfaces 68 is four, or a multiple of four. The polygonal mirror 66 is driven by an axial gap type motor 60. This motor 60 contains: a rotor 4 which is integral with the rotating shaft 52 of the motor 60; a direct bearing 56 which supports the rotating shaft 52 in such a manner as to allow smooth rotation; etc. The polygonal mirror 66 is stably fixed to the rotor 54 of the motor 60 by means of a stop ring 62 and a spring member 64.

The second optical system 70 includes a third plastic lens 72 for focusing a laser beam L on the surface of the photosensitive body 90, and a dust-preventing cover 76 for sealing the above-mentioned optical members of the optical unit 2. With respect to the main scanning direction, the third plastic lens 72 has a face which is shaped to satisfy the relationship expressed by $H=f\theta$. In other words, the distance over which the laser beam L ought to move from the optical axis in the main scanning direction in proportion to the angle θ, at which the polygonal mirror 66 or each mirror surface 68 thereof is rotated, is made to correspond to the distance H for which the laser beam L scans the photosensitive body 90 in the main scanning direction from the center of the optical axis. With respect to the sub-scanning direction the third plastic lens 72 functions as a kind of fθ lens which has positive power and which is curved such that the power decreases in accordance with an increase in the deflection angle φ with respect to the main scanning direction. Like the first plastic lens 16, the third plastic lens 72 is formed of, e.g., PMMA and has either a positioning-projection or a positioning-recess section formed substantially in the center with respect to the main scanning direction.

The dust-preventing cover 76 is a transparent glass or plastic plate. It is formed of an optical plate, such as BK7, filter glass, PMMA, or the like. It has a thickness of 2-3 mm, and permits the laser beam L to pass therethrough. In order to cut off a light having such a wavelength as adversely affects the photosensitive body 90, the dust-preventing cover 76 may be provided with a sharp cut filter function.

The first optical system 10 (lenses 14, 16 and 18) and the second optical system 70 (lens 72) ar arranged in such a manner that their optical axes form a predetermined angle in a plane expanding in the sub-scanning direction. The laser diode 12 and lenses 14 and 16 of the first optical system 10 are integrally assembled together and are held by the first optical system base 26. The base 26 contains the lens barrel 30 which will be detailed later with reference to FIGS. 3A-3C. The first mirror 24 which is arranged between the first and second plastic lenses 16 and 18 to change the traveling direction of the laser beam L, is also held by the housing 20. It should be noted that a second mirror 74 is arranged between the third plastic lens 72 and the dust-preventing cover 76, so as to change the traveling direction of the laser beam L.

The laser beam L generated by the laser diode 12 is converged by the glass lens 14 such that it becomes a converged or collimated laser beam L. When passing through a stop 22, the laser beam L is shaped to have a predetermined cross section. The laser beam emerging from the stop 22 is guided to the first plastic lens 16. When passing through the first plastic lens 16, the laser beam L is collimated in the main scanning direction and is converged in the sub-scanning direction. The laser beam L, thus processed, is then directed to the second plastic lens 18 via the first mirror 24, as is seen in FIGS. 1A and 1B. When passing through the second plastic lens 18, the laser beam L is converged in both the main scanning direction and sub-scanning direction.

The power of the first plastic lens 16 and that of the second plastic lens 18 have polarities that cancel each other in the main scanning direction. Where the first plastic lens 16 is provided with positive power, the second plastic lens 18 is provided with negative power. Conversely, where the first plastic lens 16 is provided with negative power, the second plastic lens 18 is provided with positive power.

The laser beam L emerging from the second plastic lens 18 is directed to one deflecting mirror surface 68 of the polygonal mirror 66 of the scanner 50. After being reflected by the deflecting mirror surfaces 68, the laser beam L is directed at a nonuniform angular velocity to the third plastic lens 72, which functions as a kind of fθ lens, as mentioned above. In the main scanning direction, the third plastic lens 72 suppresses the adverse effects caused by the field curve and corrects the distortion aberration to have a desirable value. In the sub-scanning direction, the third plastic lens 72 corrects the positional shift of the laser beam L on the photosensitive body 90, even if the each mirror surface 68 of the polygonal mirror 66 tilts. The laser beam L emerging from the third plastic lens 72 is directed to the photosensitive body 90 by way of the dust-preventing cover 76 which is mounted on the housing 6 of the optical unit 2.

Next, a description will be given of a structure used for converting the laser beam L generated by the laser diode into a laser beam L having a cross section of desirable size.

Referring to FIGS. 3A-3C, the glass lens 14 is secured to the lens barrel 30 by means of a push member 32 and an elastic member 34, e.g., a wave washer, etc. The lens barrel 30 is formed of a material which has a coefficient of thermal expansion that does not adversely affect the glass lens 14, and which enables high working accuracy and is sufficiently rigid. For example, the lens barrel 30 is formed of zinc or aluminum. The push member 32 includes a cylindrical portion 32a and a screw portion 32b. The cylindrical portion 32a has a pressing part on that side which contacts the glass lens 14. The position of the glass lens 14 can be adjusted in the direction indicated by arrow A by turning the push member 32. The glass lens 14 has a flange 14a. Since this flange 14a and the pressing part of the cylindrical portion 32a are in line contact with each other, the torque required for turning the push member 32 is small. On the opposite side of the pressing part, a hole 36 is formed in the push member 32. When the position of the glass lens 14 is adjusted, a specially-designed tool is inserted into the hole 36, and the push member 32 is turned by use of the tool. The wave washer 34 urges the glass lens 14 toward the push member 32, and this urging force is constantly applied to the screw portion 32b of the push member 32. Therefore, unnecessary play is not produced between the screw portion 32b of the push member 32 and the ridge of the screw portion 30b of the lens barrel 30. In this fashion, the glass lens 14 is accurately secured to the predetermined position of the lens barrel 30.

The laser diode 12 is fixed to a laser diode holder 40 by means of a screw 42. The position of the laser diode holder 40 can be adjusted in the directions indicated by arrows B and C, so that the laser diode holder 40 can be positioned in a desirable manner with reference to the lens barrel 30. The laser diode holder 40 is pressed against the lens barrel 30 with desirable pressure by means of a spring washer 46, a flat washer 44, and a screw 48. With this structure, the direction in which the major component of the laser beam L of the laser diode 12 is emitted can be easily adjusted with reference to the optical axis of the glass lens 14.

The stop 22 is adhered to the lens barrel 30 such that it is located at the back-side focal point of the glass lens 14.

Referring to FIG. 4, a laser beam L is generated from the light-output point 12a of the laser diode 12. The laser beam L is first converged by the glass lens 14 and restricted by the stop 22 located at the rear-focal plane of the glass lens 14, in such a manner that the laser beam L can form a beam spot of predetermined size. Thereafter, the laser beam L is directed to the photosensitive body 90. Let it be assumed that the stop 22 is located at a position away from the rear-focal plane of the glass lens L, for example, at the position 22b indicated by the broken lines in FIG. 4. In this case, the amount of laser beam L passing through the stop 22 is greatly varied, depending upon the location of the laser-emitting point 12a of the laser diode 12. If the laser-emitting point 12a is shifted to the position indicated by 12b, the amount of laser beam L passing through the stop 22 reduces approximately to half. In other words, in the case where the stop 22 is located at the rear-focal plane of the glass lens 14, the intensity or amount of laser beam L directed to the photosensitive body 90 can remain substantially unchanged, even if the major component of the laser beam generated by the laser diode 12 is shifted from the optical axis of the glass lens 14.

Figure 5:
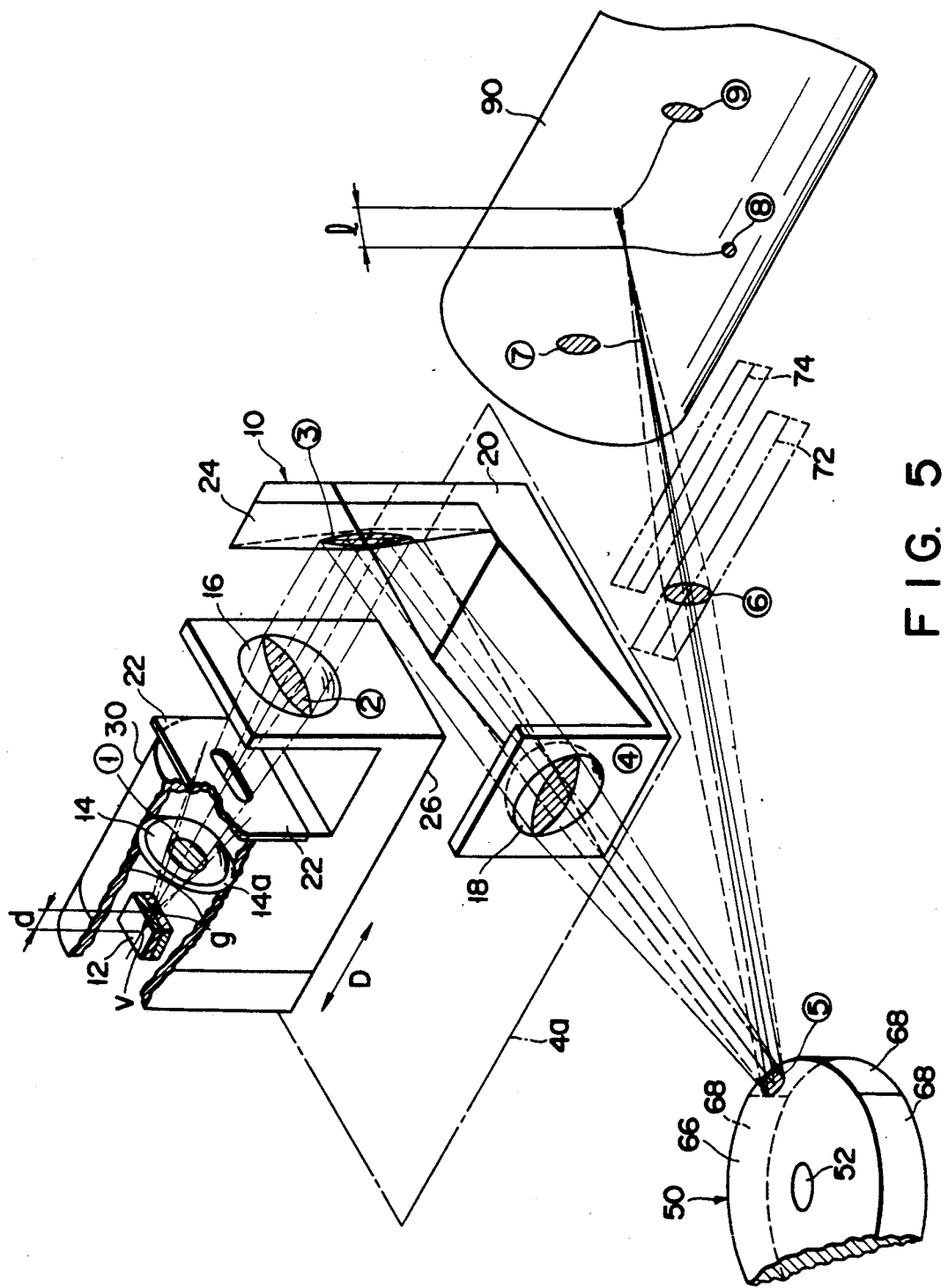
FIG. 5 is a schematic illustration showing how the astigmatic range peculiar to the laser diode and the effects which the astigmatic range has on the laser beam are eliminated.

Like other similar laser diodes, the laser diode 12 employed in the above embodiment has an astigmatic range; that is, the laser diode has range of apparent light-emitting points between a vertical direction and a horizontal direction. If the light-emitting point g determined in the horizontal direction is at an end of the interface of the laser diode, then the light-emitting point v determined in the vertical direction is isolated from light-emitting point g by distance d, as is shown in FIG. 5. As a result, the point at which the laser beam L generated by the laser diode 12 converges in the vertical direction is isolated by distance l from the point at which it converges in the horizontal direction. This problem also occurs in the case where a temperature-dependent variation in the focal length of an optical unit 2 is corrected. Therefore, the position of the laser diode 12 has to be adjusted, after the assembly of the optical unit 2, such that the beam spot of the laser beam falls within an optimal range in both the vertical and horizontal directions.

In general, the laser diode 12 is arranged such that the horizontal orientation of the light-emitting face corresponds to the main scanning direction of the optical unit 2. The arrangement being so, a laser beam generated by the laser diode 12 forms a beam spot whose size varies in the sub-scanning direction; in other words, the point of convergence of the laser beam may vary in position in the sub-scanning direction. Therefore, the astigmatic range of the laser diode 12 can be easily eliminated by adjusting the point of convergence in the sub-scanning direction alone. To be more specific, it can be easily eliminated by sliding the first optical system base 26 in the direction indicated by arrow D.

As mentioned above, the laser diode 12, the glass lens 14 and the first plastic lens 16 are assembled to the first optical system base 26 in such a manner as to constitute one unit, as is shown in FIG. 1A. As will be mentioned later, the base 26 is formed such that the focal length does not vary in response to variations in temperature and moisture. In addition, the base 26 is movable with reference to the outer housing 6, independently of the other optical elements, such as the scanner 50 and the second optical system 70. It should be noted that the first plastic lens 16 has negative power in the main scanning direction and slightly-negative power in the sub-scanning direction, so that the laser beam L which has passed through the first plastic lens 16 is substantially collimated in the main scanning direction. Since, therefore, the point at which the laser beam converges in the main scanning direction is in no way shifted by the sliding movement of the base 26, the point at which the laser beam converges in the sub-scanning direction can be easily adjusted in position by merely sliding the base 26. With respect to the astigmatic difference of the laser diode 12, therefore, the base 26 is slid to eliminate the positional variation of the focal point of the laser beam.

In the meantime, the first optical system, which requires high assembling accuracy in general, is separated from the outer housing 6 that holds the scanner 50 and the second optical system including the third plastic lens 72. Until, the outer housing 6, which is integrally formed with the lens barrel 30 can be formed of a low-in-price material. For example, the outer housing 6 can be formed of plastics.

Incidentally, in FIG. 5, the third plastic lens 72, i.e., a kind of fθ lens, and the second mirror are shown in phantom, and ①  to ⑨ indicate schematic views of the cross sectional shapes of the laser beam.

The lenses 14, 16 18, and 72 and the scanner 50 used in the embodiment have such optical characteristics as are shown in Tables 1 and 2 below.

FIG. 6 shows another embodiment of the present invention.

In FIG. 6, the lens barrel 30 portion shown in FIGS. 3A-3C and the first optical system base 28 which holds the first plastic lens 16, are integrally formed with the housing 20 which holds the second plastic lens 8. In other words, the lens barrel 30 portion and the base 28 are formed to constitute part of the housing 20, and the first optical system 10 which directs a laser beam L to the scanner 50 is assembled as one unit. As is apparent from FIG. 6, the housing 20 holds not only the above-noted optical members but also the stop 22, which restricts the intensity or amount of convergent laser beam L, and the first mirror 24, which is located between the first and second plastic lenses 16 and 18 to bend the laser beam L toward the scanner 50. It should be noted that the first, second and third plastic lenses 6, 18 and 72 are formed of the same kind of plastics, so that they operate complementary to one another in response to variations in the temperature and/or moisture. For example, if the temperature of the optical unit 2 increases, the power of the positive-power lens decreases, thus slightly converging a laser beam L. However, since the power of the negative-power lens which is paired with the positive-power lens also decreases, the laser beam L is slightly diffused at the same time. As a result, the cross

TABLE 1

| | (Lens characteristics with respect to main scanning direction) | | | | |
|---|---|---|---|---|---|
| | First Focusing System | | | | Second Focusing System |
| | Glass lens 14 | Lens 16 | Lens 18 | Polygonal Mirror 66 | Lens 72 |
| i | −1 | 2 | 3 | 4 | 5 |
| Power P | 0.0907035 | −0.0134704 | 0.0134029 | −0.025109855 | $9.92445 \times 10^{-4}$ |
| Focal Length f | 11.0294 | −74.2368 | 74.6107 | −39.825 | $-1.00761 \times 10^3$ |
| 1/v' | $3.6 \times 10^{-4}$ | 0.009685 | 0.009685 | $7.08 \times 10^{-4}$ | $9.685 \times 10^{-3}$ |
| h | 4.15011443 | 3.433239 | 3.433287 | 1.50184 | 0.660993 |

TABLE 1-continued (Lens characteristics with respect to main scanning direction)

| | First Focusing System | | | | Second Focusing |
|---|---|---|---|---|---|
| | Glass lens 14 | Lens 16 | Lens 18 | Polygonal Mirror 66 | System Lens 72 |
| h²/fv' | 5.624 × 10⁻⁴ | −0.001538 | 0.00153 | −4.010 × 10⁻⁵ | −4.200 × 10⁻⁶ |

TABLE 2

(Lens characteristics with respect to main scanning direction)

| | First Focusing System | | | | Second Focusing |
|---|---|---|---|---|---|
| | Glass lens 14 | Lens 16 | Lens 18 | Polygonal Mirror 66 | System Lens 72 |
| i | −1 | 2 | 3 | 4 | 5 |
| Power P | 0.0907035 | −0.00094897 | −0.0530289 | 0.0 | −0.0221932 |
| Focal Length f | 11.0294 | −1053.77 | −18.8576 | ∞ | 45.0588 |
| 1/v' | 3.6 × 10⁻⁴ | 0.09685 | 0.009685 | 7.08 × 10⁻³ | 9.685 × 10⁻³ |
| h | 1.68167 | 1.19603 | 0.2421888 | 0.048039 | −0.450092 |
| h²/fv' | 9.234 × 10⁻⁵ | −1.315 × 10⁻⁵ | −3.012 × 10⁻⁵ | 0.0 | 4.354 × 10⁻⁵ | section of the laser beam L has substantially the same shape and size, before and after it passes through the lenses 16, 18 and 72.

The laser beam L generated by the laser diode 12 is converged by the glass lens 14 such that it becomes a converged or collimated laser beam L. When passing through the stop 22, the laser beam L is shaped to have a predetermined cross section. The laser beam emerging from the stop 22 is guided to the first plastic lens 16. When passing through the first plastic lens 16, the laser beam L is collimated in the main scanning direction and is converged in the sub-scanning direction. The laser beam L, thus processed, is then directed to the second plastic lens 18 via the beam-bending mirror 24, as is seen in FIG. 6. When passing through the second plastic lens 18, the laser beam L is converged in both the main scanning direction and sub-scanning direction.

After being converged in both the main and subscanning directions by the second plastic lens 18, the laser beam L is directed to one deflecting mirror surface 68 of the polygonal mirror 66 of the scanner 50. Reflected by the deflecting mirror surfaces 68, the laser beam L is directed to the third plastic lens 72, which functions as a kind of fη lens, at a nonuniform angular velocity. In the main scanning direction, the third plastic lens 72 suppresses the adverse effects caused by the field curve and corrects the distortion aberration to have a desirable value. In the subscanning direction, the third plastic lens 72 corrects positional shift of the laser beam L on the photosensitive body 90, even if the mirror surfaces 68 of the polygonal mirror 66 tilt.

The lens barrel 30 portion, the base 28, the housing 20 and the first optical system 10 are formed of a material which has a coefficient of thermal expansion within a predetermined range, e.g., 10⁻⁵/°C. to 4.5×10⁻⁵/°C., preferably 1.5×10⁻⁵/°C. to 3×10⁻⁵/°C. and which enables high working accuracy and is sufficiently rigid. For example, they are integrally formed by die-casting zinc, aluminum, etc. It is known, however, that a variation in the ambient temperature causes the housing 20 to expand or contract, resulting in a variation in the distances between the lenses, a variation in the wavelength of the laser beam generated by the laser diode 12, a variation in the refractive index of the glass lens 14, etc. It is also known that variations in the ambient temperature and/or moisture result in variations in the refractive index and/or the shapes of the first, second and third plastic lenses 16, 18 and 72. In the optical unit shown in FIG. 6 and that shown in FIGS. 1A to 2B, temperature and/or moisture dependent variations in the optical characteristics are corrected in the manner below.

A description will now be given as to how the lenses and optical members incorporated in the above optical unit 2 can have constant focal lengths irrespective of changes in the ambient temperature and moisture.

Let it be assumed that nt denotes a specific temperature coefficient determined with respect to 1° C., αt denotes a coefficient of linear expansion determined with respect to 1° C., Δt denotes a temperature variation, nm denotes a specific coefficient of moisture absorption determined with respect to 1%, αm denotes a moisture-dependent coefficient of expansion determined with respect to 1%, Δm denotes a moisture variation, and f denotes the focal length of the third plastic lens 72. In this case, a temperature-dependent variation Δft in the focal length can be approximated as follows:

$$\Delta ft = (nt + \alpha t) f \cdot \Delta t \tag{1}$$

In the meantime, a moisture-dependent variation Δfm in the focal length can be approximated as follows:

$$\Delta fm = (-nm + \alpha m) f \cdot \Delta m \tag{1}$$

Let it be assumed that the focal length f, the temperature variation Δt and the moisture variation are 45 mm, 30° C. and 1%, respectively. In this case, nt=−2.09×10⁻⁴/°C. and αt=7×10⁵/°C. Therefore, the temperature-dependent variation Δft in the focal length of the third plastic lens 72 can be calculated as below, using the formula (1).

$$\Delta ft = 0.37665 \text{ mm}$$

Since nm=8.45×10⁻⁴/% and αm=2.16×10⁻³/% in the above-noted case, the moisture-dependent variation Δfm in the focal length of the third plastic lens 72 can be calculated as below, using the formula (2).

$$\Delta = 0.059175 \text{ mm}$$

From the temperature-dependent variation Δft and moisture-dependent variation Δfm noted above, the overall variation Δf can be expressed as follows:

$$\Delta fm = 0.059175 \text{ mm}$$

Since the actual focal length f of the third plastic lens 2 includes the overall variation $\Delta f$, it can be expressed as follows:

$$\Delta f = \Delta ft + \Delta fm = 0.43583 \text{ mm}$$

If the distance $Z_0$ between the focal point of the laser beam emitted from the optical unit 2 with respect to the sub scanning direction and the front principal plane of the third plastic lens 72 is 90 mm, then the distance $Z_1$ between the rear-principal plane of the third plastic lens 72 and a point on which the laser beam must be converged should be equal to 90 mm. However, since the actual distance between the back-side principal point of the third plastic lens 72 and the surface of the photosensitive body 90 includes a variation caused by temperature and moisture, it is expressed as:

$$Z_1 + \Delta Z = 91.74332 \text{ mm} \quad (\Delta Z = 4\Delta f)$$

Therefore, in the case where the actual focal length includes a variation $\Delta f$, the size of a cross section of the laser beam L can be expressed as follows:

$$W = W_0 \sqrt{1 + \frac{\Delta Z \lambda^2}{\pi W_0}} \quad (3)$$

where W is a radius (μm) of the laser beam L in the state where the actual focal length has been varied from f to "$f+\Delta f$", $W_0$ is a radius of the laser beam L in the state where the actual focal length does not vary and is therefore f, and $\lambda$ is a wavelength of the laser beam.

Assuming that $\lambda = 785$ nm and $W_0 = 25$ μm, the radius W of the laser beam L can be calculated as 30.78 μm on the basis of the formula (3), provided that the focal length is not corrected. In this case, the variation in the radius of $W_0$ of the laser beam L is as large as 23% or so.

In order to improve the optical characteristics of a thin lens, the chromatic aberration must be eliminated from the surface of the photosensitive body 90. The condition for enabling this elimination is given by:

$$\sum_{i=1}^{m} \frac{h_i^2}{f_i v_i} = 0 \quad (4)$$

where $h_i$ is the distance between a point of an i-th lens on which the laser beam is incident and an optical axis center, $f_i$ is the focal length of the i-th lens, $v_i$ is the dispersive power of the i-th lens, and m is the number of optical elements in the optical unit 2.

The formula (4) is used where the wavelength $\lambda$ of the laser beam incident upon each optical element changes and optical elements are different from one another in refractive index. With respect to temperature and moisture-dependent changes in the refractive power and/or shape of each lens, the "dispersive $v_i$" can be expressed as below, assuming that a variation in "dispersive $v_i$" corresponds to a variation in wavelength.

$$\frac{\Delta f_i}{f_i} = \frac{1}{v'i}$$

If the "dispersive power $v_i$" in formula (4) is replaced with a "pseudo-dispersive $v'i$" which depends upon variations in temperature and moisture and if this "pseudo-dispersive $v'i$? is assumed to be a constant value determined on the basis of the temperature and moisture dependent variations in the refractive index and shape, then the following formula is derived from formulas (1) and *(2):

$$\frac{\Delta f_i}{f_i} = (-n_{ti} + a_{ti})\Delta t + (-n_{mi} + a_{mi})\Delta m = \frac{1}{v'i} \quad (5)$$

If this formula (5) is satisfied, the size of a laser beam L focused on the surface of the photosensitive body 90 is prevented from varying in spite of temperature and moisture changes. In other words, the aberrations can be eliminated from the surface of the photosensitive body 90 if the formula below is satisfied.

$$\sum_{i=1}^{m} \frac{h_i^2}{f_i v'i} \quad (6)$$

Since the pseudo-dispersive power $v'i$ is a function dependent on temperature and moisture variations, it is desired that the lenses be made of the same kind of material. If the lenses are made of different materials, formula (6) is difficult to satisfy, in the case where the temperature and moisture vary in a wide range. In the embodiment, the first optical system contains a combination of a glass lens and plastic lenses. In the descriptions below, therefore, how the glass lens is corrected to satisfy formula (6) and how the plastic lenses are corrected to satisfy formula (6) will be considered independently of each other.

Where the plastic lenses are made of the same material, the value of the pseudo-dispersive power $v'i$ is constant, irrespective of temperature and moisture variations. Thus, formula (6) can be rewritten as:

$$\frac{1}{v'} \sum_{i=1}^{m} \frac{h_i^2}{f_i} = 0 \quad (7)$$

By satisfying the formula below, therefore, a variation in the focal length can be corrected with reference to the surface of the photosensitive body 90 even if the temperature and moisture vary or the wavelength varies in any manner.

$$\frac{h_i^2}{f_i} = 0 \quad (8)$$

It should be noted that the $1/v_i$ of a mirror suface face 68 included in the polygonal mirror 66 is negligible because its effects are very small in comparison with the effects brought about by temperature and moisture variations or wavelength variations. In the case where a lens is thickened, therefore, formula (8) may be rewritten as below.

$$\frac{h_i^2}{f_i} \neq 0 \quad (9)$$

In this case, however, the focal length of the entire optical unit can be corrected if formula (1) is satisfied.

With respect to the glass lens 14, it is only necessary to consider a temperature-dependent variation in the focal length since the glass lens 14 hardly absorbs moisture. Therefore, if the material and shape of the lens barrel 30 are properly determined, the temperature-dependent variation in the focal length of the glass lens 14 can be canceled by the thermal expansion of the lens barrel 30. With respect to the glass lens 14, therefore, the following equations can be obtained: $\Delta fi = 0$ and $v'i = \infty$.

As is apparent from formula (4), the first and second plastic lenses should be a combination of a positive-power lens and a negative-power lens. Since the second optical system has small power in the main scanning direction, the first optical system incorporates a glass lens, and also plastic lenses respectively having positive power and negative power which allow the absolute values of focal lengths to become substantially equal to each other. Incidentally, the range within which the second plastic lens is arranged can be widened if the first plastic lens is provided with negative power so as to allow an axial beam to be collimated. With respect to the sub-scanning direction, it should be noted that the second optical system incorporating the third plastic lens includes a mechanism for correcting an error caused by mirror tilting. Therefore, the first optical system should satisfy the following formula:

$$\sum_{i=1}^{m} \frac{hi^2}{fiv'i} < \sum_{i=1}^{m} \frac{hi^2}{fiv'i} \quad (10)$$

where l denotes a number obtained by adding 1 to the number of lenses incorporated in the first optical system.

It should be noted that the size of the optical system can be reduced by decreasing the power of the first lens of the first optical system and by providing a large part of negative power for the second lens. Therefore, the distance for which the image point of the entire optical system moves in the sub-scanning direction becomes shorter than the distance for which the image point of the third plastic lens moves per se.

Let it be assumed that $v'$ represents the pseudo-dispersive power of the group of lenses incorporated in the optical unit 2, the temperature variation $\Delta t$ is 30° C., and the moisture variation $\Delta m$ is 1%. If, in this case, the values of $nt$, $nm$, $\alpha t$ and $\alpha m$ are equal to the values of the conventional case, then $1/v'$ can be calculated as below on the basis of formulas (1) and (2):

$$\frac{1}{v'} = (-nt + \alpha t)\Delta t + (-nm + \alpha m)\Delta m$$
$$= 9.685 \times 10^{-3}$$

Since the glass lens 14 is formed of optical glass BK7, its moisture absorption is negligible. Therefore, $1/v'$ can be calculated as below by substituting $(-3 \times 10^{-6})$ for $nt$ and $(9 \times 10^{-6})$ for $\alpha t$.

$$\frac{1}{v'} = (-nt + \alpha t)\Delta t = 3.6 \times 10^{-4}$$

Since the scanner 50 is formed of aluminum, its moisture absorption is negligible, like the glass lens 14. Therefore, $1/v'$ can be calculated as below by substituting $(-2.36 \times 10^{-5})$ for $\alpha t$.

$$\frac{1}{v'} = \frac{\Delta f}{f}$$

$$= \{R + (R \times \alpha t \times \Delta t/2) - (R/2)\}/(R/2)$$
$$= \alpha t \times \Delta t$$
$$= 7.08 \times 10^{-4}$$

where R is the curvature of the deflecting mirrors 68 of the scanner 50.

The $1/v'$ of the glass lens 14 should be free from adverse effects which may be caused by wavelength variations. In other words, the value of each of formulas (4) and (6) should be 0. Since l (the number obtained by adding 1 to the number of lenses incorporated in the first optical system) is 4 and m (the number of optical elements in the optical unit 2) is 5, formulas (4) and (6) can be respectively rewritten as below.

$$\frac{1}{vg} \times \frac{h1^2}{f1} + \frac{1}{va} \times \frac{h4^2}{f4} + \frac{1}{vp} \sum_{i=2,3,5} \frac{hi^2}{fi} = 0 \quad (11)$$

$$\frac{1}{v'g} \times \frac{h1^2}{f1} + \frac{1}{v'a} \times \frac{h4^2}{f4} + \frac{1}{vp} \sum_{i=2,3,5} \frac{hi^2}{fi} = 0 \quad (12)$$

where
$vg$ is the dispersive power of optical glass BK7;
$v'g$ is the pseudo-dispersive power which optical glass BK7 has in relation to temperature and moisture variations;
$vp$ is the dispersive power of PMMA;
$v'p$ is the dispersive power which PMMA has in relation to temperature and moisture variations;
$va$ is the dispersive power of aluminum; and
$v'a$ is the dispersive power which aluminum has in relation to temperature and moisture variations.

The values of $v'g$ and $v'a$ may vary in accordance with the temperature, while the value of $v'p$ may vary in accordance with both temperature and moisture. Therefore, in order to satisfy formulas (11) and (12) in any environmental condition, the optical members of the optical unit 2 are designed in such a manner as to simultaneously satisfy the folowing three formulas:

$$\frac{h1^2}{vgf1} + \frac{h4^2}{vaf4} = 0 \quad (13)$$

$$\frac{h1^2}{v'gf1} + \frac{h4^2}{v'af4} = 0 \quad (14)$$

$$\sum_{i=2,3,5} \frac{hi^2}{fi} = 0 \quad (15)$$

The optical elements are designed in the manner mentioned above, in not only the optical unit 2 shown in FIG. 6 but also the optical unit shown in FIGS. 1A-2B. In both these optical units, therefore, the focal lengths are in no way varied in spite of temperature and moisture variations.

In the optical unit of the present invention, the optical elements which require high positional accuracy (namely, the laser diode, the glass lens, and that one of a pair of toric lenses which is closer to the laser diode than the other) are arranged to constitute a lens barrel. This lens barrel is slidable and is provided independently of the optical elements which do not require very high positional accuracy, such as the scanner and the second optical system. Therefore, the housing of the optical unit can be formed of a low-in-price material at low manufacturing cost. For example, the housing can be easily formed of plastics. In addition, even if the astigmatic range peculiar to the laser diode results in a positional difference between the convergent point determined in a horizontal direction and that determined in a vertical direction, such a positional difference can be easily corrected by sliding the lens barrel. Moreover, since the lens barrel is free from adverse effects which may be caused by temperature and moisture variations, it can be positioned at very high accuracy at all times. It should be also noted that, where the astigmatic range of the laser diode is sufficiently small, the entire first optical system can be formed as a unit which is hardly affected by temperature and moisture variations. In such a case, the optical unit can maintain desirable optical characteristics, irrespective of the temperature and moisture variations. Accordingly, it is possible to provide an optical u it which is easy to assemble or adjust and which can be fabricated by use of low-in-price members or parts at low fabrication cost.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical unit comprising:
   means for generating a light beam;
   first converting means for converting the generated light beam into a light beam which is collimated in a first plane expanding in one of main and sub-scanning directions and which is converged in a second plane expanding in the other of the main and sub-scanning directions;
   first holding means for integrally holding said generating means and said first converting means, said first holding means being movable in a predetermined direction;
   second converting means for converting the light beam emitted from said first converting means into a convergent light beam which is convergent in both the first and second planes;
   means for reflecting the light beam emitted from said second converting means in a predetermined direction;
   mean for guiding the light beam reflected by the reflecting means to a predetermined portion on the surface of an object to be scanned, while simultaneously shaping the light beam to have a predetermined diameter; and
   second holding means for holding said first holding means, said second converting means, said reflecting means and said guiding means.

2. An optical unit according to claim 1, wherein:
   said first converting means includes: at least one glass lens located close to the generating means and having an aspheric surface; and at least one plastic lens which is one of a pair of lenses having substantially the same power and opposite polarities with respect to one of the main and sub-scanning directions and which is closer to the glass lens than the other;
   said second converting means includes at least one plastic lens which is paired with the plastic lens of the first converting means; and
   said guiding means includes at least one plastic lens functioning as a kind of f$\theta$ lens.

3. An optical unit according to claim 2, wherein the plastic lens of the first converting means, the plastic lens of the second converting means, and the plastic lens of the guiding means include lenses which contain materials having substantially the same optical characteristics.

4. An optical unit according to claim 1, wherein said first holding means includes a material having a coefficient of thermal expansion in the range of $1.5 \times 20^{-5}/°C$. to $3 \times 10^{-5}/°C$.

5. An optical unit comprising:
   means for generating a light beam;
   first converting means for converting the generated light beam into a light beam which is collimated in a first plane expanding in one of main and sub-scanning directions and which is converged in a second plane expanding in the other of the main and sub-scanning directions;
   second converting means for converting the light beam emitted from said first converting means into a convergent light beam which is converged in both the first and second planes;
   first holding means for integrally holding said generating means and said first and second converting means;
   means for reflecting the light beam emitted from the second converting means in a predetermined direction;
   means for guiding the light beam reflected by said reflecting means to a predetermined portion on the surface of an object to be scanned, while simultaneously shaping the light beam to have a predetermined diameter; and
   second holding means for integrally holding said first holding means, said reflecting means and said guiding means.

6. An optical unit according to claim 5, wherein:
   said first converting means includes: at least one glass lens located close to the generating means and having an aspheric surface; and at least one plastic lens which is one of a pair of lenses having substantially the same power and opposite polarities with respect to one of the main and sub-scanning directions and which is closer to the glass lens than the other;
   said second converting means includes at least one plastic lens which is paired with the plastic lens of the first converting means; and
   said guiding means includes at least one plastic lens functioning as a kind of f$\theta$ lens.

7. An optical unit according to claim 6, wherein the plastic lens of said first converting means, the plastic lens of said second converting means, and the plastic lens of said guiding means include materials having substantially the same optical characteristics.

8. An optical unit according to claim 6, wherein said first holding means includes a material having a coefficient of thermal expansion in the range of $1.5 \times 10^{-5}/°C$. to $3 \times 10^{-5}/°C$.

* * * * *